Patented Oct. 19, 1937

2,096,681

UNITED STATES PATENT OFFICE 2,096,681

METHOD FOR THE PREPARATION OF CELLULOSE ETHERS

Eugene J. Lorand, Wilmington, Del., assignor to Hercules Powder Company, Wilmington, Del., a corporation of Delaware No Drawing. Application April 27, 1935, Serial No. 18,512

5 Claims. (Cl. 260—152)

This invention relates to a method for the preparation of cellulose ethers.

Heretofore it has been known to prepare cellulose ethers by reacting a mixture of cellulose, alkali, water and an etherifying agent. Heretofore it has been the practice in producing cellulose ethers to rapidly heat the mixture to a high temperature and to maintain the temperature uniform throughout the reaction. Such procedure has been dictated by the fact that among other conditions high temperature accelerates the etherification reaction.

The product of the prior procedure indicated, i. e., rapidly bringing a mixture of cellulose, alkali, water and an etherifying agent up to a high temperature and maintaining the temperature throughout the reaction, has not been found entirely satisfactory in that under the conditions indicated the reaction does not proceed evenly in all the fibers of the cellulose, with the result that the product lacks uniformity. Further, such product is often found unsatisfactory for use, for example, in the formation of films in that it often gives hazy solutions in organic solvents and films prepared therefrom are not only hazy, but also show the so-called "orange peel" effect.

As an alternative procedure, it has been heretofore suggested to effect the etherification of cellulose by gradually heating a mixture of cellulose, alkali, water and an etherification agent up to reaction temperature over a period and then maintaining a reaction temperature until the reaction is complete. Such procedure has been found to be disadvantageous more particularly in that the yield of cellulose ether is unduly low (United States Patent No. 1,437,821, December 5, 1932, to Seel).

Now in accordance with this invention a method for the production of cellulose ethers is provided by which a product is produced which does not have the disadvantageous characteristics of the product produced by procedure involving rapid heating and maintenance of a high temperature and, at the same time, a method by which a high yield will be obtained in comparison with the low yield obtained by the procedure involving gradual heating up to reaction temperature over a period and then maintaining the temperature to complete the reaction.

In accordance with this invention it has been found that the gradual heating to reaction temperature of a reaction mass comprising cellulose, alkali, water and an etherifying agent results in degradation of the cellulose by the alkali before any material etherification takes place and that consequently on the reaction mass attaining a reaction temperature a low yield of cellulose ether is obtained due to the loss of cellulose by degradation during the preliminary heating period. For example, it has been found that degradation of cellulose by, for example, caustic soda, is considerable even at such moderate temperatures as 70–80° C., whereas at such temperatures etherification with many etherifying agents is hardly noticeable. Further, in accordance with this invention, it has been found that the degrading effect of alkali upon cellulose is greatly reduced if the cellulose is at least partially etherified. Thus, it follows that gradual heating of a reaction mass comprising cellulose, alkali, water and an etherifying agent exposes unreacted and, therefore, unprotected cellulose fibres to the degrading effect of the alkali, with the result that some of the cellulose is destroyed before it has a chance to become etherified.

The method in accordance with the present invention comprises rapidly heating a reaction mass comprising cellulose, alkali, water and an etherifying agent to a relatively high temperature, such that the speed of etherification is high, maintaining a relatively high reaction temperature for a relatively short period and then reducing the temperature to a moderate reaction temperature at which the reaction will proceed at a moderate rate and maintaining the moderate reaction temperature for a relatively longer period to complete the reaction.

In proceeding in accordance with the method of this invention, the rapid heating of the reaction mixture to a relatively high temperature causes etherification of the cellulose fibers to proceed at a high rate so that at least partial etherification occurs rapidly and the cellulose is thus rapidly afforded protection against the degrading effect of the alkali. As a matter of fact, the rapid heating to a relatively high temperature and resultant rapid etherification affords substantial protection to the cellulose fibers against the degrading effect of the alkali before any substantial degradation of the cellulose fibers occurs. The subsequent heating at a moderate reaction temperature at which the etherification proceeds at a moderate rate, results in the production of a uniformly etherified product. At the moderate reaction temperature under which the etherification is completed, the tendency toward degradation of the cellulose by the alkali is less than at relatively high reaction temperatures and, at the same time, during the period of heating at a moderate reaction temperature, as has been indicated, the cellulose is largely protected against degradation by virtue of the fact that it is partially etherified.

The method in accordance with this invention is adaptable for the production of cellulose ethers generally by any procedure from the standpoint of detail which may be selected or desired. As will now be perceived, the essence of the invention lies in the heating rapidly to relatively high reaction temperature, which relatively high temperature is maintained for a relatively short period of time and then lowering the temperature to a moderate or relatively low reaction temperature and maintaining such temperature to completion of the reaction.

While the method in accordance with this invention is adaptable to the production of cellulose ethers generally, it will be found of especial advantage in the production of alkyl ethers such, for example, as are produced with the use of alkyl halides, as alkyl chlorides, bromides, etc. Proceeding to the practical adaptation of the method in accordance with this invention, cellulose of any suitable type and of any suitable form, as, for example, purified cotton linters, may be used. Cellulose may be used in an air dry condition or may be given any desired pretreatment. As the alkali, caustic soda as usual will be desirably used. Any suitable etherifying agent, as a benzyl halide and alkyl halides, or the like, may be used. Generally speaking, the reaction mass will include a small amount of water. If desired, the cellulose, alkali and water may be present as alkali cellulose, which may be prepared according to any known or desired method for preparing alkali cellulose. On the other hand, the cellulose, alkali, water and etherifying agent may be separately added together to form the reaction mass, i. e. without previous preparation of alkali cellulose.

If desired, an inert solvent, such as benzene, toluene, dioxan, or the like, either alone or with a small proportion of an alcohol may be used as a diluent in the reaction mass, though generally speaking it will be desirable to avoid use of a diluent. The alkali, as indicated, will desirably be caustic soda and desirably a solid caustic of good quality containing sodium chloride as the only impurity in appreciable amount, will be used.

As has been indicated, the etherifying agent may be any suitable etherifying agent. Where alkyl ethers are to be produced, the use of alkyl halides, preferably an alkyl chloride, will be used, inasmuch as the chlorides are cheaper than the bromides though the latter react more rapidly.

In proceeding more particularly for the production of alkyl ethers, and more specifically ethyl cellulose, the reaction mass comprising cellulose, alkali, an etherifying agent and water, will be first rapidly heated to a temperature of about 120° C. to about 150° C. Such temperature will be maintained for a relatively short period. Thus, for example, where the reaction mass is rapidly heated to a temperature of about 125° C. to about 135° C., such temperature will be maintained for a period of about 1 to 3 hours and such period will comprise a first stage in which the etherification of cellulose will be rapid and the cellulose will be protected from degradation by the alkali. In the first stage, the etherification will be rapid and as a consequence a minimum of degradation will occur despite the relatively high temperature.

On completion of the first stage, the temperature will be lowered to a moderate reaction temperature, for example, to a temperature of about 105° C. to about 120° C., preferably a temperature of about 110° C. Such temperature will then be maintained for a period which will constitute a second stage and which period will be relatively long as compared with the period constituting the first stage. Where the temperature is lowered to about 110° C. and such temperature maintained throughout the second stage, the period of the second stage will be from about six hours to about twelve hours. The first stage generally will be not more than half of the total reaction period.

In the first stage, as has been indicated, the etherification will occur at a high rate, but under the conditions etherification will not be uniform in all the fibers of the cellulose, since some parts of the fibers will react more than others. In the second stage, under the conditions existing, the difference in degree of etherification of the fibers will be eliminated. In the second stage the cellulose molecules having the lowest degree of etherification will react more readily than those having a relatively high degree of etherification, which latter will react more sluggishly. Thus, an equalization will take place resulting in a substantially uniformly etherified product.

In proceeding in accordance with the method of this invention, if desired, water generally used in the reaction mass may be replaced in whole or in part with an alcohol, as ethanol, propanol, butanol, or the like.

By way of specific illustration of practical adaptation of the method in accordance with this invention, for the production of an alkyl ether of cellulose, for example, 28 parts by weight of purified cotton linters, conditioned in air at 100% humidity, 54 parts by weight of sodium hydroxide in flakes or pellets, 16 parts by weight of ethanol and 140 parts by weight of ethyl chloride are introduced into an autoclave equipped with an agitator, or, if desired, the autoclave may be of a rotating type and if of such type may contain balls to afford adequate agitation of the reaction mass.

The autoclave having been charged, the reaction mass is rapidly heated to a temperature of about 130° C. The heating may be accomplished in any suitable or desired manner, as, for example, by introducing a heating medium into a jacket surrounding the autoclave. The temperature of 130° C. is maintained for a period of about 1½ to about 2 hours, during which period the reaction mass is subjected to agitation, either by operation of an agitator, with which the autoclave may be equipped, or by rotating the autoclave. After about 2 hours, the temperature of the reaction mass is rapidly lowered to about 110° C., which temperature is maintained substantially constant for a period of about 8 to 10 hours, after which the reaction will be complete.

The ethyl cellulose formed may be recovered by any of the well known processes. Thus, for example, by first removing from the reaction mass excess ethyl chloride and volatile byproducts of the reaction by distillation, then mixing the residue with hot water with vigorous stirring. The product will be obtained in small, porous crumbs, which are washed with water to free them from salt and then dried in an oven.

The product produced in accordance with the above example will amount to about 34 parts, constituting a yield of about 98–99% of the theoretical, and will be found to contain about 49–49.5% ethoxyl.

It will be appreciated that in carrying out the method in accordance with this invention any suitable apparatus, such as indicated in connection with the above specific example, may be used, since the carrying out of the method is not dependent upon the use of any particular form of apparatus. It will further be understood that the product obtained by carrying out the method in accordance with this invention may be recovered as indicated in connection with the above specific example, or by any suitable or well known procedure.

It will be understood that the essence of the method in accordance with this invention resides in the rapid heating to a relatively high reaction temperature, then lowering the temperature to a moderate or relatively low reaction temperature and maintaining such temperature for a relatively longer period than that during which the relatively high reaction temperature is maintained.

Consequently, it will be appreciated that the above description and specific example may be widely departed from in detailed procedure without departing from the scope of this invention.

What I claim and desire to protect by Letters Patent is:

1. Method for the preparation of cellulose ethers which includes rapidly heating a reaction mass including cellulose, alkali and an etherifying agent to a temperature of from about 120° C. to about 150° C., maintaining the reaction mass at said temperature for from about one to about three hours to effect substantial partial etherification of the cellulose fibres, whereby the cellulose fibres are protected against the degrading effect of the alkali present, then lowering the reaction temperature to a temperature of about 105° C. to about 120° C. and maintaining said temperature for more than three hours and until the reaction is complete.

2. Method for the preparation of alkyl ethers of cellulose which includes rapidly heating a reaction mass including cellulose, alkali and an alkylating agent to a temperature of from about 120° C. to about 150° C., maintaining the reaction mass at said temperature for from about one to about three hours to effect substantial partial etherification of the cellulose fibres, whereby the cellulose fibres are protected against the degrading effect of the alkali present, then lowering the reaction temperature to a temperature of about 105° C. to about 120° C. and maintaining said temperature for more than three hours and until the reaction is complete.

3. Method for the preparation of alkyl ethers of cellulose which includes rapidly heating a reaction mass including cellulose, alkali and an alkyl halide to a temperature of from about 120° C. to about 150° C., maintaining the reaction mass at said temperature for from about one to about three hours to effect substantial partial etherification of the cellulose fibres, whereby the cellulose fibres are protected against the degrading effect of the alkali present, then lowering the reaction temperature to a temperature of about 105° C. to about 120° C. and maintaining said temperature for more than three hours and until the reaction is complete.

4. Method for the preparation of ethyl cellulose which includes rapidly heating a reaction mass including cellulose, alkali and an ethylating agent to a temperature of from about 120° C. to about 150° C., maintaining the reaction mass at said temperature for from about one to about three hours to effect substantial partial etherification of the cellulose fibres, whereby the cellulose fibres are protected against the degrading effect of the alkali present, then lowering the reaction temperature to a temperature of about 105° C. to about 120° C. and maintaining said temperature for more than three hours and until the reaction is complete.

5. Method for the preparation of ethyl cellulose which includes rapidly heating a reaction mass including cellulose, alkali and ethyl chloride to a temperature of from about 120° C. to about 150° C., maintaining the reaction mass at said temperature for from about one to about three hours to effect substantial partial etherification of the cellulose fibres, whereby the cellulose fibres are protected against the degrading effect of the alkali present, then lowering the reaction temperature to a temperature of about 105° C. to about 120° C. and maintaining said temperature for more than three hours and until the reaction is complete.

EUGENE J. LORAND.